United States Patent
Kjaergaard et al.

(10) Patent No.: US 9,759,190 B2
(45) Date of Patent: *Sep. 12, 2017

(54) WIND TURBINE AND METHOD OF CONSTRUCTION OF A WIND TURBINE

(75) Inventors: Finn Kjaergaard, Ry (DK); Jesper Munch, Vejle (DK)

(73) Assignee: SIEMENS AKTIENGESELLSCHAFT, München (DE)

(*) Notice: Subject to any disclaimer, the term of this patent is extended or adjusted under 35 U.S.C. 154(b) by 653 days.

This patent is subject to a terminal disclaimer.

(21) Appl. No.: 13/637,045

(22) PCT Filed: Mar. 11, 2011

(86) PCT No.: PCT/EP2011/053659
§ 371 (c)(1),
(2), (4) Date: Sep. 25, 2012

(87) PCT Pub. No.: WO2011/117081
PCT Pub. Date: Sep. 29, 2011

(65) Prior Publication Data
US 2013/0011273 A1   Jan. 10, 2013

(30) Foreign Application Priority Data
Mar. 26, 2010 (EP) ..................... 10157892

(51) Int. Cl.
*F03D 7/02* (2006.01)
*F03D 80/00* (2016.01)
*F03D 15/20* (2016.01)

(52) U.S. Cl.
CPC ............ *F03D 7/0224* (2013.01); *F03D 15/20* (2016.05); *F03D 80/00* (2016.05); *F05B 2240/14* (2013.01);
(Continued)

(58) Field of Classification Search
CPC ... F03D 11/0075; F03D 11/005; F03D 7/0224
(Continued)

(56) References Cited

U.S. PATENT DOCUMENTS 3,872,881 A * 3/1975 Miller .................. E02F 3/65
137/355.17
6,425,788 B1 * 7/2002 Lindholm ............ B63H 3/082
416/157 R
(Continued)

FOREIGN PATENT DOCUMENTS

CN   1671970 A   9/2005
CN   101473135 A   7/2009
(Continued)

OTHER PUBLICATIONS

ES2321252 Machine Translation. Accessed EPO website Feb. 26, 2015. 12 pages.*

*Primary Examiner* — Richard Edgar

(57) ABSTRACT

Disclosed is a wind turbine with a nacelle and a rotor, the rotor including a number of blades and a hub, the nacelle and the hub being connected with each other in an interface region, the wind turbine further including a transport system for transporting hydraulic and/or pneumatic fluid from the nacelle into the hub. The transport system includes a rotary unit as a connection through which the fluid passes and a part of which rotates in operation together with the hub which rotary unit is positioned in the hub at a position distanced from the interface region facing away from the nacelle, the transport system further including a pipe system leading from the interface region into the hub to the rotary unit and being fixed in its position. The disclosure also concerns a method of construction of such wind turbine.

12 Claims, 5 Drawing Sheets

Figure 1:
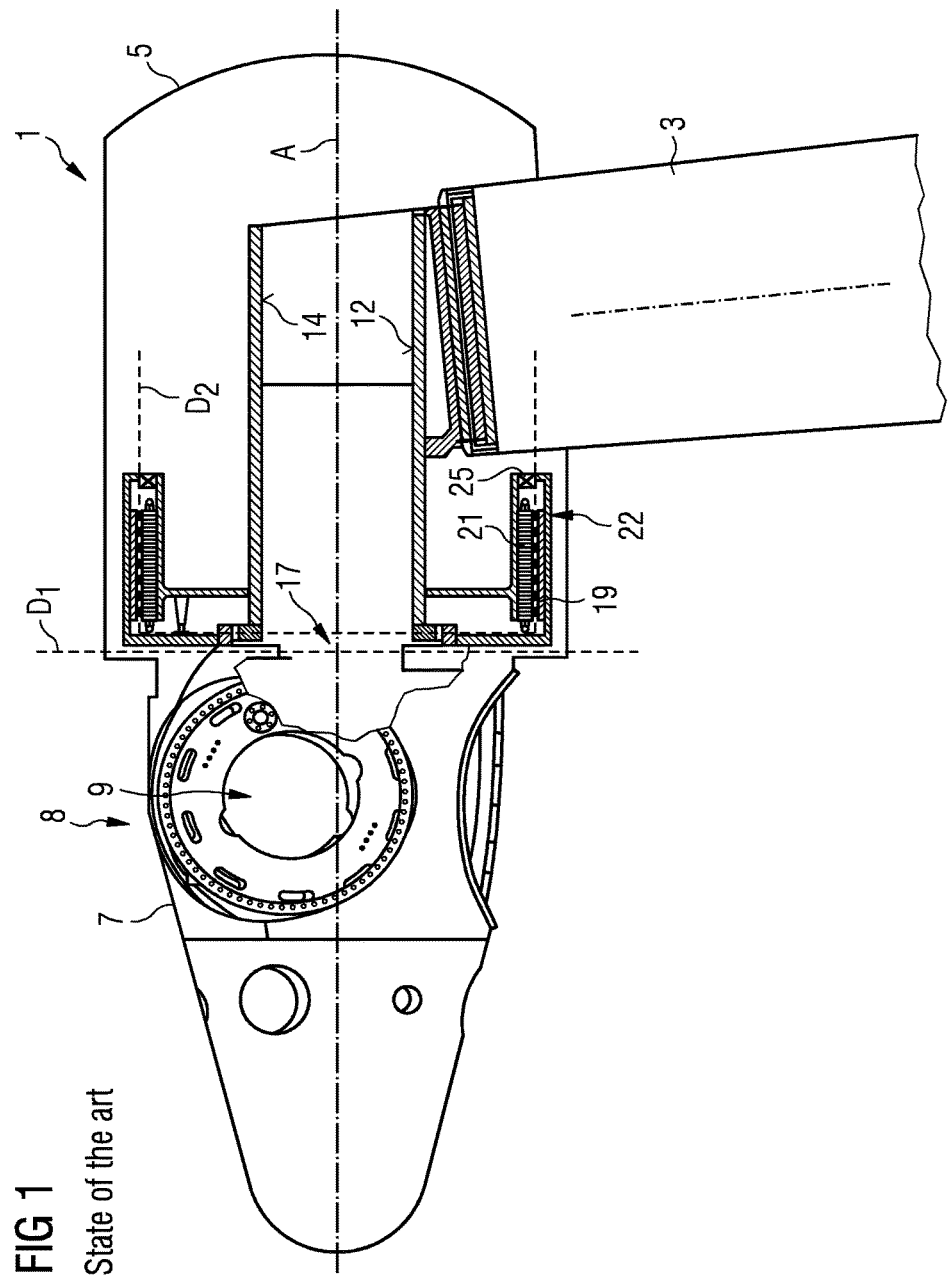

(52) U.S. Cl.
CPC ..... *F05B 2260/406* (2013.01); *F05B 2260/60* (2013.01); *F05B 2260/74* (2013.01); *F05B 2260/79* (2013.01); *Y02E 10/721* (2013.01); *Y02E 10/723* (2013.01); *Y02E 10/726* (2013.01)

(58) Field of Classification Search
USPC .............. 416/155, 156, 157 R, 159, 162
See application file for complete search history.

(56) References Cited

U.S. PATENT DOCUMENTS 9,194,364 B2* 11/2015 Kjaergaard ............ F03D 7/0224
2008/0078228 A1* 4/2008 Nies ........................ 73/1.01

FOREIGN PATENT DOCUMENTS

| DE | 3110266 A1 | 2/1982 |
| DE | 20317749 U1 | 3/2005 |
| GB | 2071779 A | 9/1981 |
| WO | WO 2008000882 A1 * | 1/2008 |
| WO | 2009138201 A2 | 11/2009 |

* cited by examiner

State of the art

WIND TURBINE AND METHOD OF CONSTRUCTION OF A WIND TURBINE

CROSS REFERENCE TO RELATED APPLICATIONS

This application is the US National Stage of International Application No. PCT/EP2011/053659, filed Mar. 11, 2011 and claims the benefit thereof. The International Application claims the benefits of European application No. 10157892.0filed Mar. 26, 2010. All of the applications are incorporated by reference herein in their entirety.

FIELD OF THE INVENTION

The invention relates to a wind turbine with a nacelle and a rotor, the rotor comprising a number of blades and a hub, the nacelle and the hub being connected with each other in an interface region, the wind turbine further comprising a transport system for transporting hydraulic and/or pneumatic fluid from the nacelle into the hub. The invention also relates to a method of construction of such a wind turbine.

BACKGROUND OF THE INVENTION

Today's wind turbines, in particular large scale wind turbines with power outputs in the scale of above 1 MW, are very complex systems. Despite their large size, their operational state needs to be adaptable to current weather conditions, in particular wind conditions. For that purpose, the position of the rotor blades of the rotors of such wind turbines can be adapted. A so-called pitch control system allows for positioning the rotor blades against the wind by rotating the blades around their longitudinal axis. Thus, the rotational speed of the rotor can be controlled and a maximum power output can be achieved.

The usual way of pitch control of the rotor blades is by using an electric pitch control system in which electric engines control the pitch of the blades. However, it has been wished for to use hydraulic pitch systems (or pneumatic pitch systems—which are also summarized under the expression "hydraulic pitch system" in the context of this application) rather than electric ones. Such hydraulic systems are often easier to control and they also still function in the case of an interruption of power output of the generator of the wind turbine because they are not directly dependent on electric power supply by the wind turbine itself. In order to drive such hydraulic pitch systems it is necessary to have a transport system which transports a hydraulic and/or pneumatic fluid (such as hydraulic oil, water or any other liquid or gas) into the pitch control system in the hub under a certain pressure. In other words, the hydraulic and/or pneumatic fluid is put under a certain pressure by means of a pump and lead to a distribution block, to blade blocks and accumulator blocks which are all located inside the hub in close proximity to the rotor blades.

The transport of this pressurised hydraulic and/or pneumatic fluid, however, has proven to be quite complicated. This is due to the fact that the hub rotates in operation of the wind turbine so that a solution has to be found of how the pipes of the transport system are not rotated together with the hub in such a way that they will be damaged due to torsions.

SUMMARY OF THE INVENTION

It is therefore an object of the invention to provide a possibility of supplying and/or operating a wind turbine with an enhanced transport system for transporting hydraulic or penaumatic fluid from the nacelle into the hub of the wind turbine. One particular object of the invention is also to provide such a transport system which poses a minimum obstacle to staff who want to enter the hub from the nacelle for purpose of maintenance and/or assembly of the wind turbine.

The objects of the invention are achieved by a wind turbine according to claim 1 and by a method according to claim 10.

Accordingly, a wind turbine of the above-mentioned kind is realized such that the transport system comprises a rotary unit as a connection through which the fluid passes and a part of which rotates in operation together with the hub which rotary unit is positioned in the hub at a position distanced from the interface region facing away from the nacelle, the transport system further comprising a pipe system leading from the interface region into the hub to the rotary unit and being fixed in its position Rotary units can be characterized as construction elements of a transport system with a stationary (or non-rotatable) part and a rotatable (or non-stationary) part connected to each other in such way that the rotating part can rotate around a predefined rotation axis. The connection between the stationary part and the rotatable part is such that essentially no hydraulic and/or pneumatic fluid passes from the inside of the rotary unit to its outside, i.e. the inner side of the rotation unit is isolated such that it prevents a leakage. When fluid is led into the inside of the stationary part it will pass into the inside of the rotatable part and from there into other (stationary or non-stationary) parts of the transport system. The fluid can also be led into the rotatable part and pass into the stationary part. The fluid passes from the nacelle into the hub, but it can possibly also be led back into the opposite direction if needed. For instance, a pump situated in the nacelle can pump the fluid via the rotary unit into a hydraulic pitch system in the hub. The fluid may also be led back into the nacelle, for example into a reservoir in the nacelle.

The invention makes use of such a rotary unit which is specifically positioned in the hub at a position distanced from the interface region facing away from the nacelle. Such an interface region is situated at the inside of the wind turbine as a transition area in which both the nacelle and the hub end and which can thus be assigned either to the nacelle or to the hub, but not clearly to any of both. The nacelle forms a first cavity, the space surrounded by the direct drive generator forms a second cavity and the hub forms a third cavity. The interface region is located where the second cavity is connected to the third cavity. The interface region is normally used in order to get from the nacelle into the hub which implies that an average sized adult man can travel through the cavities. No main functional elements of the wind turbine are situated in the cavities in the interface region. Such functional parts are in particular the rotor, the pitch system, or the generator. In the case of a direct drive wind turbine (which will be described in detail below) the generator can be assembled around the interface region, i.e. not in the interface region itself, but surrounding it. Generally, the interface region can be derived from the outside limits of the nacelle facing in the direction of the hub. The outside limits of the nacelle are best defined by the limits of its outer shell, the so-called canopy. These limits define a plane extending through the inside of the wind turbine. From this plane to either side into the nacelle and into the hub the interface region extends not more than 0.3 metres.

In other words, the rotary unit is positioned inside of the hub, i.e. away from the nacelle on the other side of the interface region. Due to this positioning the rotary unit does not stand in the way of operations either within the nacelle or in the interface region through which staff want to pass without being hindered by any objects such as the rotary unit.

Such positioning also has the advantage that the stationary part of the rotary unit is connected to the nacelle whereas the rotatable part of the rotary unit can be directly connected to the hub, in particular to the pitch system within the hub. Thus the stationary part of the wind turbine, i. e. the nacelle, is connected to the stationary part of the rotary unit, whereas the rotatable part of the wind turbine, i. e. the hub, is connected to the rotatable part of the rotary unit. The functions of the parts of the rotary unit match with the functions of the nacelle and of the hub respectively. Positioning the rotary unit in the hub means that it is placed at the very location in which the hydraulic fluid is needed, i.e. as close as possible to the pitch system. It is for that reason that staff working in the inside of the wind turbine can freely pass into the hub without being hindered by a rotary unit. This is particularly so in a direct drive wind turbine: from the rotating hub some parts project into the nacelle. These parts carry a rotor of a generator which is surrounded by (or which surrounds) stator coils of this generator. This stator is carried by the nacelle. Thus, the region of the interface between the hub and the nacelle is essentially hollow so that persons can pass from the nacelle into the hub easily. In this case, the drive train comprises those parts which project from the hub into the nacelle and which are essentially formed pipe-like. Therefore, such drive train in a direct drive wind turbine can also be characterized as a communication link or communication assembly in contrast to drive trains in an indirect drive wind turbine (where the drive train comprises a number of shafts). In the cavity formed by this pipe-like arrangement, a rotary unit could hinder staff from safely entering the hub or from returning back to the nacelle from the hub if the rotary unit is positioned in the interface region or further in the nacelle. The positioning of the rotary unit in the hub prevents such problems effectively.

A method of construction of a direct drive wind turbine according to the invention includes the steps of equipping the transport system with a rotary unit as a connection through which the fluid passes and a part of which rotates in operation together with the hub, which rotary unit is positioned in the hub at a position distanced from the interface region facing away from the nacelle, and whereby a transport system is installed which further comprises a pipe system leading from the interface region into the hub to the rotary unit and which is fixed in its position so that it is not rotated during operation of the rotary unit.

Particularly advantageous embodiments and features of the invention are given by the dependent claims, as revealed in the following description. Thereby, features revealed in the context of the wind turbine may also be realized in the context of any of the methods according to the invention and vice versa.

The invention can generally be used in any kind of wind turbine, be it a direct drive wind turbine or an indirect drive wind turbine: in a so-called indirect drive wind turbine a drive train, i.e. a rotatable shaft, is led along the axis of rotation of the hub into the inside of the nacelle. The drive train will then be led into a gearbox and further from there into a generator. In contrast, in so-called direct drive wind turbines no gearbox is necessary, and from the rotating hub some parts project into the nacelle. These parts carry a rotor of a generator which is surrounded by (or which surrounds) stator coils of this generator. This stator is carried by the nacelle. In such a case the region of the interface between the hub and the nacelle is essentially hollow so that persons can pass from the nacelle into the hub easily. The drive train then comprises those parts which project from the hub into the nacelle and which are essentially formed pipe-like.

As the passage between the nacelle and the hub is occupied by the shaft in the case of an indirect drive train, the invention makes particular use in such wind turbines in which the passage in the interface region is completely free. Therefore it is preferred that the wind turbine according to the invention is realized as a direct drive wind turbine with a drive train directly connecting the rotor with a generator, i.e. with not gearbox and no connecting shaft passing in the middle of the interface region. In direct drive wind turbines all of the above-mentioned advantages of the invention can be used to their full extent which is why this embodiment is particularly preferred.

Such a fixing of the pipe system in its position within the hub can for instance be realized by a solid, rigid, non-flexible pipe which is affixed to an inside surface or another fixed element placed within the nacelle. The pipe then projects from the nacelle into the hub and is preferably stable enough to keep its position within the hub without any stabilizing elements. It is preferred, however, that the pipe system is fixed within the hub by means of a rail projecting from the nacelle into the hub. Such a rail is made of solid material with a sufficient stability to keep the pipe of the pipe system in its position during operation of a rotating hub. The pipe(s) of the pipe system is/are connected to this rail and thus led by the rail into the hub. The rail can protrude as far into the hub as to bridge the distance between the end of the nacelle, i.e. the interface region, and the hydraulic pitch system in the hub, for instance in the middle of the hub. The pipe is first guided along the rail and then can be led through free air to the rotary unit to which it is connected.

In such a case, the transport system may comprise pipes made of any material. Inflexible pipes such as metal pipes or pipes made of solid plastics may be used in particular in all those regions of the transport system which need to be protected from persons stepping onto them and/or from objects that might potentially injur them during operation or maintenance of the wind turbine. However, the transport system may also comprise a flexible pipe (or hose) if a rail is used.

In a particularly preferred embodiment the rail extends from the nacelle to the rotary unit. This means that the rail goes right from the nacelle up to the rotary unit so that the pipe is supported along its entire way from the interface region to the rotary unit by the rail.

The rail can be realized as a straight rail with no curves, but it may also have a shape describing a turn of direction. For instance, the rail may be straight from the nacelle into the hub and then extend in a different direction within the hub, i.e. towards the pitch system. The rail can be made of any solid material allowing for sufficient stability to keep its position and shape during operation of the wind turbine, i.e. during rotation of the hub. For instance a metal rail or a rail made of solid plastics can be utilized.

Preferably the rail is equipped with a cavity in which a pipe of the pipe system is positioned. Such cavity can be realized by using a tubular or partly tubular, i.e. cylindrical or partly cylindrical rail. A cavity can however also be realized by a rail having for instance an open cross-sectional shape (at least in parts along its longitudinal extension) such as a U-shape or a V-shape. In other words, the rail has a cross-sectional shape inside of which a pipe of the pipe system can be accommodated without an obvious necessity to further fixing the pipe to the rail. Another way of how to lead the pipe along the rail is to fix the pipe at least locally along its longitudinal extension to the rail, for instance by means of brackets and/or by means of adhesion.

In order to provide for a particularly stable and obstacle-free arrangement of the transport system within the wind turbine the rail can be fixed to the nacelle in such way that in the interface region it is situated closely to an inner surface of the wind turbine. For instance, the rail can be fixed to a ceiling surface or to a floor surface or to a side wall of the nacelle in the region of the interface region so that staff wishing to pass from the nacelle into the hub will not be hindered by an obstacle posed by the rail itself.

As outlined above, it is particularly advantageous if the rotary unit is directly connected to a hydraulic and/or pneumatic pitch system in the hub. That means that the pitch system for which the fluid is supplied is directly fed with that fluid by the rotary unit without any intermediate pipe or other elements of a transport system. The shortest and safest way possible to transport the fluid from the rotary unit into the pitch system is thus realized.

Preferably the direct drive wind turbine further comprises a pump situated in the nacelle which pump in operation provides for pressure of the fluid in the transport system. That implies that the pump which provides for sufficient pressure within the transport system is situated remotely from the hub, i.e. remote from the pitch system in the first cavity of the wind turbine. The pump is thus situated in that part of the wind turbine, i.e. the nacelle, in which several functional parts of a similar kind as the pump itself would be positioned anyway. Such functional parts include control systems of the wind turbine or other parts which are integrated in housings and which are positioned in those spaces within the wind turbine where they can easily be maintained by staff without the need to enter the hub.

In contrast, positioning a pump in the hub itself would mean that the pump either stands in the way of operations in the hub or that it is connected to a part of the hub in such way that it will rotate together with the hub. That would mean that the power supply for the pump becomes very difficult. If one positioned the pump in the interface region that would mean that it Constitutes an obstacle for staff to enter the hub or to return from the hub into the nacelle. To sum up, positioning the pump and possibly a reservoir for the fluid inside of the nacelle is—under the given circumstances of the rotary unit being placed in the hub—a very good solution of how to operate the pump easily while not hindering staff at the same time.

As for the rotary unit, it is particularly advantageous to position its rotation axis at a rotation axis of a drive train connecting the rotor with a generator—or in other words of a rotation axis of the hub, i.e. of the rotor. Both rotation axes are thus the same so that the rotary unit does not need to rotate with a different orientation than the rotation movement of the rotor itself. That way it can be realized that the rotatable part of the rotary unit is rotated along the same rotation axis as the drive train whereas the stationary part can remain in its position all throughout the operation of the wind turbine. A particular advantageous way of how to realize this is to directly connect the rotary unit to the pitch system, which pitch system is then preferably positioned at the centre of rotation, i.e. the rotation axis of the rotor.

Other objects and features of the present invention will become apparent from the following detailed descriptions considered in conjunction with the accompanying drawings.

It is to be understood, however, that the drawings are designed solely for the purposes of illustration and not as a definition of the limits of the invention.

Figure 2:
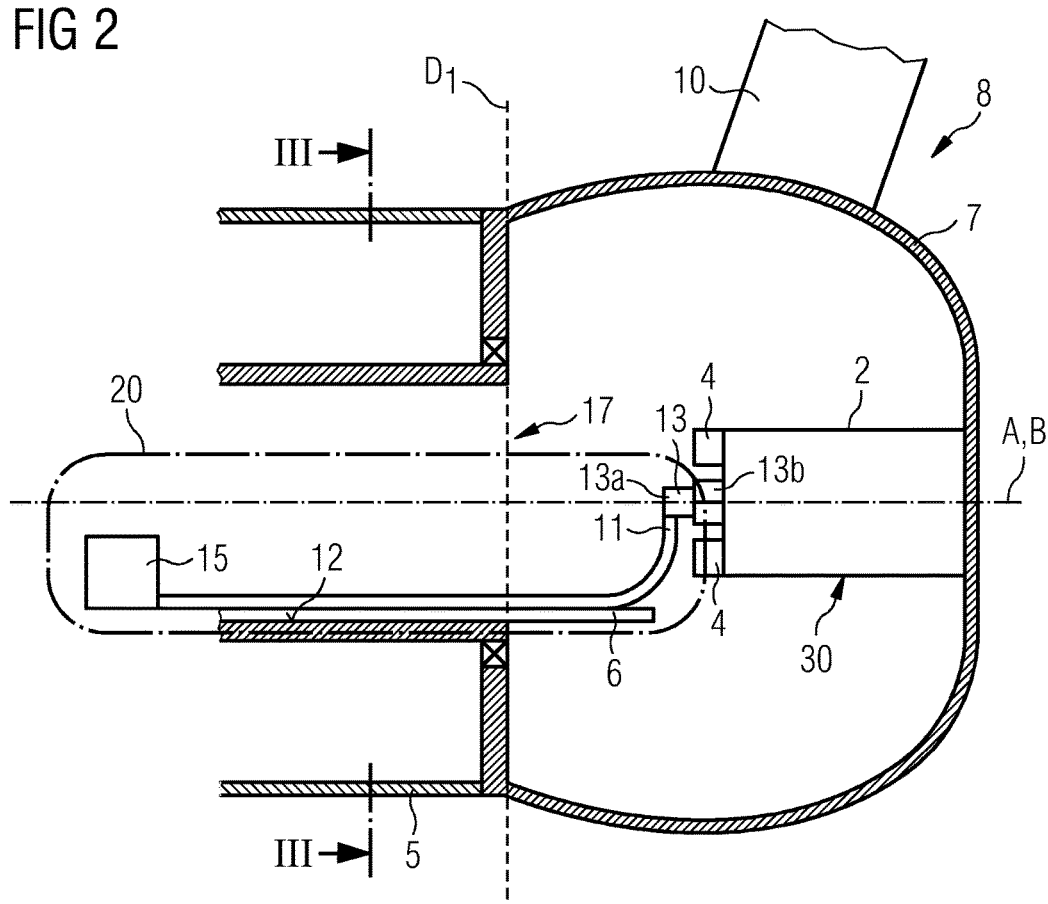
Figure 3:
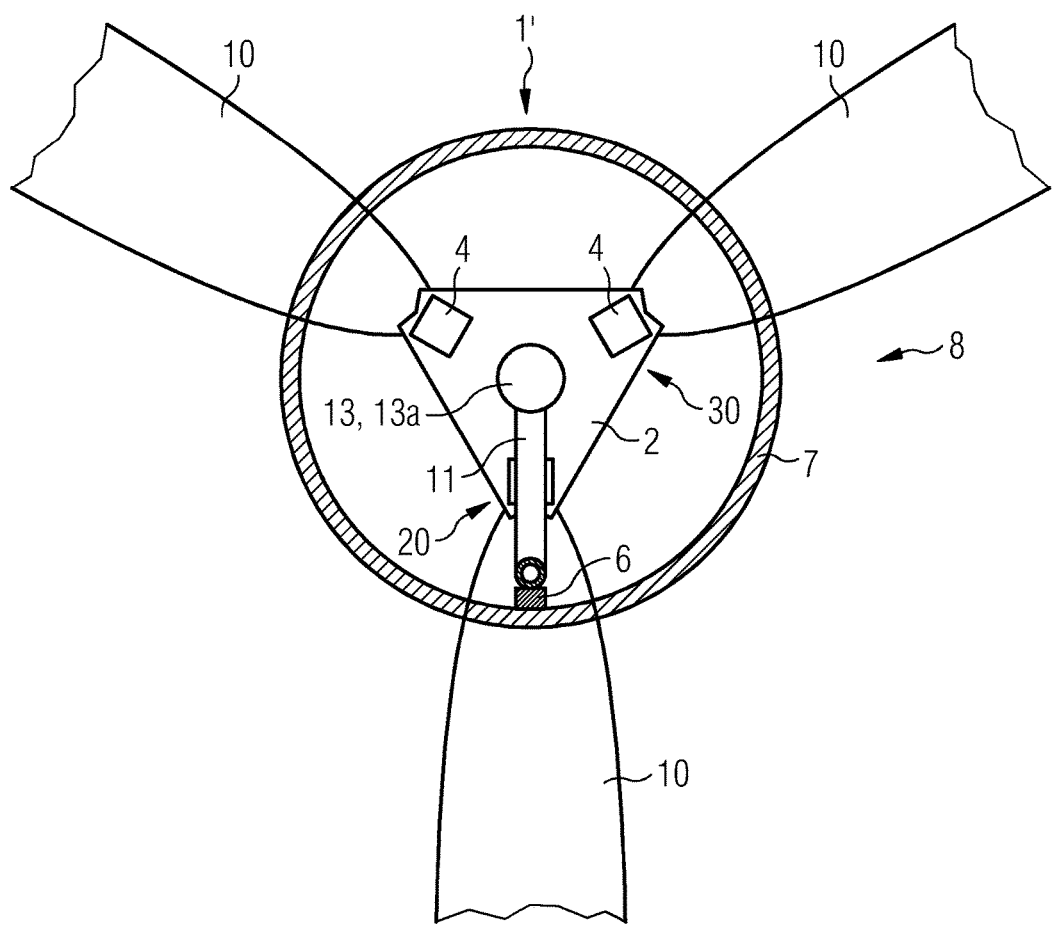
Figure 4:
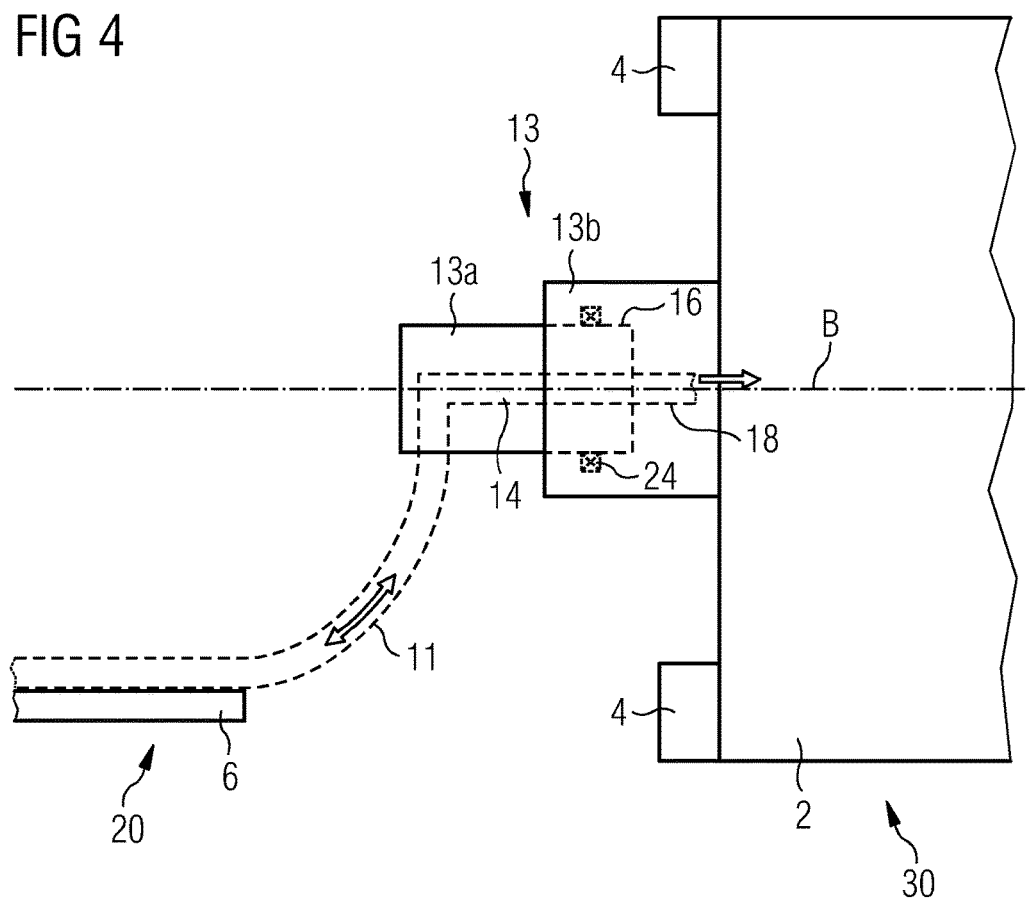
Figure 5:
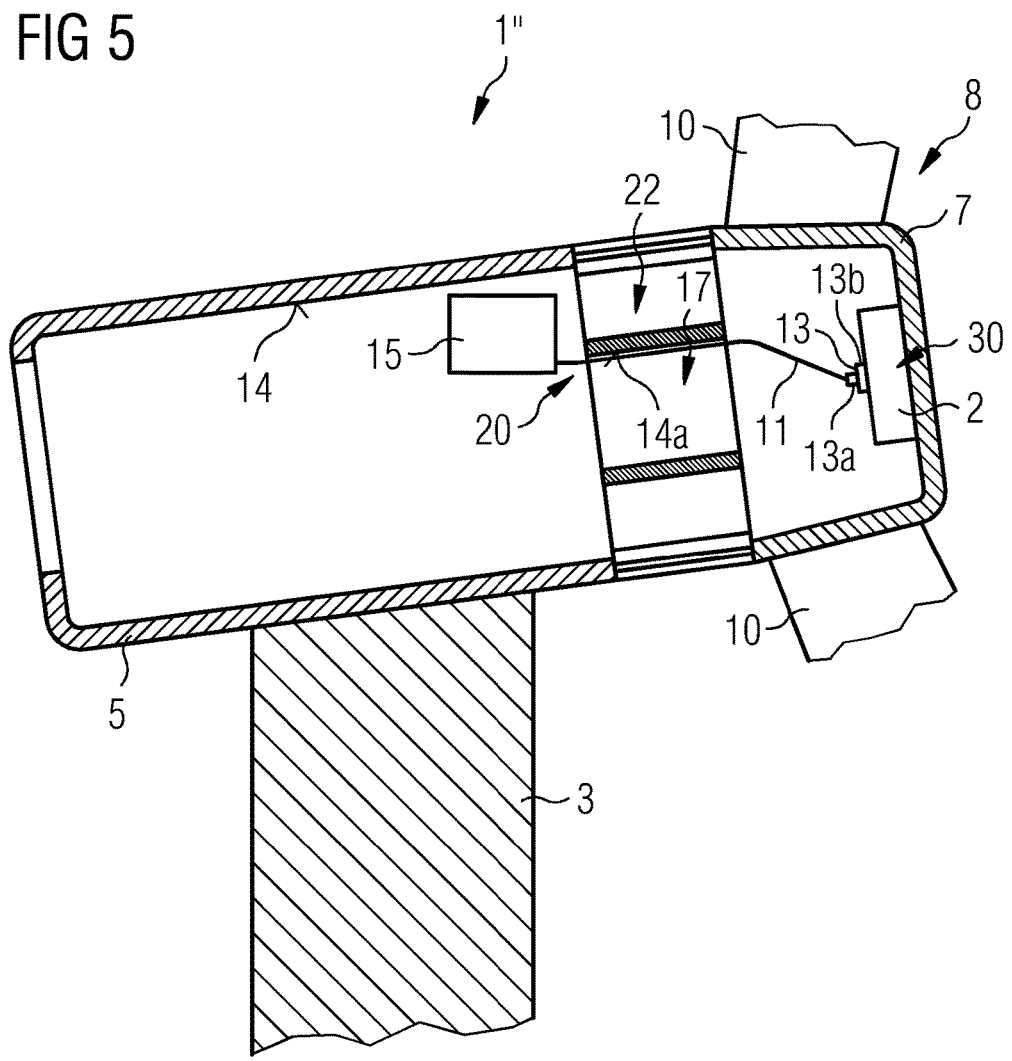

FIG. 1 shows partially sectional side view of a wind turbine according to the state of the art, FIG. 2 shows details of a first embodiment of a wind turbine according to the invention, FIG. 3 shows a view into the hub of the same wind turbine along line III-III in FIG. 2, FIG. 4 shows a side view of a rotary unit which can be used as an element of a transport system according to an embodiment of the invention, FIG. 5 shows a second embodiment of a wind turbine according to the invention.

In the drawings, like reference numbers refer to like objects throughout. Objects in the diagrams are not necessarily drawn to scale.

DETAILED DESCRIPTION OF THE INVENTION

FIG. 1 shows a wind turbine 1 with a nacelle 5 and a rotor 8. The rotor 8 comprises a hub 7 and rotor blades (not shown), which can be inserted into openings 9 within the hub 7. The nacelle 5 is positioned on top of a tower 3. At its inside it comprises inside sufaces 12, 14, i.e. a bottom floor 12 and a ceiling 14.

The wind turbine 1 is realized as a direct drive wind turbine 1 with a generator 22 which directly transfers the rotational energy of the rotation of the hub 7 into electrical energy. The generator 22 comprises a stator 21 and a generator rotor 19 which generator rotor 19 is moved rotatingly along bearings 25 relative to the stator 21 around a rotation axis A of the rotor 8. This rotation axis A therefore also constitutes the rotation axis A of a drive train which includes those parts of wind turbine 1 which project from the rotor 8 into the generator 22.

Due to the movement of the generator rotor 19 which is directly connected to the hub 7 electric current is induced in the windings of the stator 21 which electric current can then be transferred to users. Between the nacelle 5 and the hub 7 there is an interface region 17. This interface region 17 extends from a division line D1 which is defined by the outside limits of the nacelle 5 both into the nacelle 5 and into the hub 7 about 0,5 metres, in some cases less, for instance 0,2 metres (depending on the size of the wind turbine 1 in question). A strict definition of the interface region only includes the division line D1 itself in the inside of the wind turbine 1 as the interface region.

In wind turbines according to the state of the art the positioning of the rotor blades, i.e. their pitch, is normally controlled by an electric pitch system. If one wishes to use a hydraulic pitch system instead a problem arises concerning the transport of the hydraulic or pneumatic fluid to the pitch system. The hydraulic pitch system is positioned at that end of the inside of the hub 7 which faces away from the nacelle 5. The transport of the hydraulic fluid needs to be done by means of transport system supported by a pump providing the pressure within the transport system to feed the pitch system in the hub 7. Due to the movement of the rotor 8 such transport is particularly difficult as normal pipes of the transport system would quickly be twisted due to the rotation movement of the rotor.

FIGS. 2 and 3 show a detailed view of a direct drive wind turbine 1' according to an embodiment of the invention. Again, the wind turbine 1' comprises a rotor 8 and a nacelle 5 to which the rotor 8 is rotatably fixed so that it can be rotated along a rotation axis A. In the wind turbine 1' a hydraulic pitch system 30 is installed which controls the pitch of the rotor blades 10. In FIG. 3 it can be seen that the hydraulic pitch system 30 comprises an accumulator block 2 and three blade blocks 4 which are each connected to one of the rotor blades 10 in order to control their pitch. In the accumulator block 2 the hydraulic fluid is collected and the blade blocks 4 adjust the position of the rotor blades 10 induced by the pressure of the fluid. Directly connected with the accumulator block 2 there is a rotary unit 13 comprising a first (stationary) part 13a and rotatable (non-stationary) part 13b which rotates together with the hub 7 of the rotor 8. The rotary unit 13 will be described in more detail in the context of FIG. 4. In order to feed the rotary unit 13 with hydraulic fluid, in this case oil, a pipe system 11 is led from the nacelle 5 where a pump 15 is situated into the hub 7 to the first part 13a of the rotary unit 30. The pipe system 11 comprises a solid or rigid pipe which is further supported by a rail 6 underneath it. The rail 6 is firmly fixed to the nacelle 5 on an inside surface 12, namely on the bottom floor 12. The rail 6 thus runs along the bottom floor 12 and projects further into the cavity of the inside of the hub 7 of the rotor 8. The rail 6 therefore stabilizes the position of the pipe system 11 and holds the pipe system 11 in position within the hub 7.

As can be seen in FIG. 3 the pipe system 11 comprises a pipe of hollow shape lying upon the rail six and then projecting (cf. FIG. 2) up to the rotation axis A of the hub 7. The rotation axis A of the hub 7 is also the rotation axis B of the rotary unit 13. The pump 15, the pipe 11 supported by the rails 6 and the rotary unit 13 make up a transport system 20 for the hydraulic fluid. This way hydraulic fluid can flow from the pump 15 in the direction of the rotary unit 13 and back while staff can easily walk through the interface region 17 essentially without being hindered by any parts of the transport system 20 projecting into the passage.

FIG. 4 depicts a more detailed side view of the rotary unit 13 with parts of the hydraulic pitch system 30 and parts of the transport system 20. As outlined before, the rotary unit 13 comprises a first stationary part 13a and a second rotatable part 13b which rotates around the rotation axis B. The stationary part 13a is partially inserted into a cavity 16 in the rotatable part 13b and lead along a bearing 24 which also hermetically seals the connection between the first part 13a and the second part 13b. Into the rotary unit 13 there leads a pipe of the pipe system 11 which is supported by the rail 6 as outlined in the context of FIGS. 2 and 3. From where the pipe of the pipe system 11 is connected to the first part 13a of the rotary unit 13 there is a channel 14 inside of the stationary part 13a leading into the direction of the rotatable part 13b. This (first) channel 14 of the first part 13a leads into a second channel 18 in the rotatable part 13b. This second channel 18b leads into the accumulator block 20 where hydraulic fluid is collected and led further into the direction of the blade blocks for adjusting the pitch of the rotor blades 10 (cf. FIGS. 2 and 3). Hydraulic fluid can thus be transported to and fro from the pump 15 (cf. FIGS. 2 and 3) into the hydraulic pitch system 30 and back. Thereby, the rotation of the hub 7 and thus of the rotatable part 13b of the rotary unit 13 does not prevent a safe flow of the fluid from the pump 15 into the pitch system 30 and back.

FIG. 5 shows a second embodiment of a wind turbine 1" according to the invention, again realized as a direct drive wind turbine 1". In contrast to the embodiment shown in FIGS. 2 and 3 no use is made of a rail 6, but rather the transport system 20 is mainly assembled in a ceiling area of the wind turbine 1". The pump 15 is located close to the ceiling 14 of the nacelle 5 and the pipe system 11 is led along the ceiling part 14a of the cavity formed by the generator 22, which cavity ends in the interface region 17 of the wind turbine 1". The pipe system 11 is firmly fixed to the ceiling 14 and the ceiling part 14a. It comprises a rigid, solid pipe made of metal which is stable enough to hold itself in position and which describes an essentially linear way from the pump 15 into the hub 7 where it then turns slightly down into the direction of the rotary unit 13 situated diagonally below. An advantage of this embodiment can be seen in the fact that staff are not in danger of even stepping on a part of the transport system 20 so that one is even less hindered during passage of the interface region 17.

It may be understood that the transport system 20 may comprise different elements and/or different outlays of elements, in particular concerning the pipes and the channels 14, 18 as well as the connections between rotatable parts and stationary parts. For instance, the pipe system 11 may also comprise plastic pipes and also (if sufficiently supported in critical regions, particularly the hub) flexible pipes rather than non-flexible, rigid ones.

Although the present invention has been disclosed in the form of preferred embodiments and variations thereon, it will be understood that numerous additional modifications and variations other than those mentioned could be made thereto without departing from the scope of the invention.

For the sake of clarity, it is to be understood that the use of "a" or "an" throughout this application does not exclude a plurality, and "comprising" does not exclude other steps or elements.

LIST OF REFERENCE SIGNS 1, 1', 1" wind turbine
3 tower
4 blade blocks
5 nacelle
6 rail
7 hub
8 rotor
9 openings
10 rotor blades
11 pipe system
12 inside suface—bottom floor
13 rotary unit
13a first (stationary) part
13b second, (rotatable, non-stationary) part
14 ceiling part
14 first channel
14 inside suface—ceiling
15 pump
16 cavity
17 interface region
18 second channel
19 generator rotor
2 accumulator block
20 transport system
21 stator
22 generator
24 bearing
25 bearings
30 hydraulic pitch system
A rotation axis
B rotation axis
$D_1$ division line

The invention claimed is:

1. A wind turbine, comprising:
a rotor comprising a hub and a plurality of blades;
a nacelle connected to the hub in an interface region, wherein the nacelle and rotor are aligned along a rotational axis,
wherein the interface region between the hub and the nacelle is essentially hollow with no main functional elements of the wind turbine situated in the interface region;
a transport system for transporting fluid from the nacelle into the hub, the transport system comprising a rotary unit and a pipe system,
wherein the rotary unit is positioned in the hub at a distance away from the interface region, a first part of the rotary unit rotatable with the hub and a second part of the rotary unit is stationary within the hub, the fluid is transported through the rotary unit,
wherein the pipe system leads from the interface region into the hub to the rotary unit and being fixed in its position within the hub via a rail projecting from the nacelle in-to the hub, and
wherein the fluid is hydraulic fluid and/or pneumatic fluid.

2. The wind turbine according to claim 1, wherein the wind turbine is direct drive with a drive train directly connecting the rotor with a generator.

3. The wind turbine according to claim 1, wherein the rail extends from the nacelle to the rotary unit.

4. The wind turbine according to claim 1, wherein the rail is equipped with a cavity in which a pipe of the pipe system is positioned.

5. The wind turbine according to claim 1, wherein the rail is fixed to the nacelle such that the interface region the rail is situated closely to an inner surface of the nacelle.

6. The wind turbine according to claim 1,
wherein the rotary unit is directly connected to a hydraulic and/or pneumatic pitch system in the hub.

7. The wind turbine according to claim 1, further comprising:
a pump situated in the nacelle, the pump configured to provide for an increased pressure of the fluid in the transport system.

8. The wind turbine according to claim 1,
wherein the rotation axis of the rotary unit is positioned at a rotation axis of a drive train connecting the rotor with a generator.

9. A wind turbine, comprising:
a rotor comprising a hub and a plurality of blades;
a nacelle connected to the hub in an interface region;
a transport system for transporting fluid from the nacelle into the hub, the transport system comprising a rotary unit and a pipe system,
wherein the rotary unit is positioned in the hub at a distance away from the interface region, a first part of the rotary unit rotatable with the hub and a second part of the rotary unit is stationary, the fluid is transported through the rotary unit
wherein the pipe system leads from the interface region into the hub to the rotary unit and being fixed in its position within the hub via a rail projecting from the nacelle into the hub, and
wherein the fluid is hydraulic fluid and/or pneumatic fluid.

10. The wind turbine according to claim 9,
wherein the rail extends from the nacelle to the rotary unit.

11. The wind turbine according to claim 9,
wherein the rail is equipped with a cavity in which a pipe of the pipe system is positioned.

12. The wind turbine according to claim 9,
wherein the rail is fixed to the nacelle such that the interface region the rail is situated closely to an inner surface of the nacelle.

* * * * *